United States Patent
Ooms et al.

(10) Patent No.: US 6,852,663 B2
(45) Date of Patent: Feb. 8, 2005

(54) DOUBLE-METAL CYANIDE CATALYSTS FOR PREPARING POLYETHER POLYOLS

(75) Inventors: Pieter Ooms, Krefeld (DE); Jöerg Hofmann, Krefeld (DE); Walter Schäfer, Leichlingen (DE)

(73) Assignee: Bayer Aktiengesellschaft, Levekrusen (DE)

( * ) Notice: Subject to any disclaimer, the term of this patent is extended or adjusted under 35 U.S.C. 154(b) by 260 days.

(21) Appl. No.: 10/138,080

(22) Filed: May 3, 2002

(65) Prior Publication Data

US 2003/0119663 A1 Jun. 26, 2003

(30) Foreign Application Priority Data

May 7, 2001 (DE) .......................... 101 22 019

(51) Int. Cl.⁷ .................... B01J 27/26; B01J 31/00
(52) U.S. Cl. ................. 502/175; 502/159; 502/162; 502/167; 502/168; 502/172
(58) Field of Search ................. 502/175, 159, 502/162, 167, 168, 172

(56) References Cited

U.S. PATENT DOCUMENTS

| | | | |
|---|---|---|---|
| 3,404,109 A | 10/1968 | Milgrom | |
| 3,829,505 A | 8/1974 | Herold | |
| 3,941,849 A | 3/1976 | Herold | |
| 5,158,922 A | 10/1992 | Hinney et al. | 502/175 |
| 5,470,813 A | 11/1995 | Le-Khac | 502/175 |
| 5,482,908 A | 1/1996 | Le-Khac | 502/156 |
| 5,536,883 A | 7/1996 | Le-Khac | 568/620 |
| 5,545,601 A | 8/1996 | Le-Khac | 502/156 |
| 5,627,120 A | 5/1997 | Le-Khac | 502/156 |
| 5,637,673 A | 6/1997 | Le-Khac | 528/405 |
| 5,712,216 A | 1/1998 | Le-Khac et al. | 502/175 |
| 5,789,626 A | 8/1998 | Le-Khac | 568/620 |
| 6,018,017 A | 1/2000 | Le-Khac | 528/421 |
| 6,323,375 B1 * | 11/2001 | Hofmann et al. | 568/613 |

FOREIGN PATENT DOCUMENTS

JP          4-145123          5/1992

* cited by examiner

*Primary Examiner*—Elizabeth D. Wood
(74) *Attorney, Agent, or Firm*—Joseph C. Gil; John E. Mrozinski, Jr.

(57) ABSTRACT

The invention is directed to a double-metal cyanide catalyst for the preparation of a polyether polyol by the polyaddition of an alkylene oxide on to a starter compound containing active hydrogen atoms, wherein the DMC catalyst comprises a) at least one double-metal cyanide compound; b) at least one organic complexing ligand which is not a polyether, polyester, polycarbonate, polyalkylene glycol sorbitan ester, polyalkylene glycol glycidyl ether, glycidyl ether, glycoside, carboxylic acid ester of polyhydric alcohol, cyclodextrin, phosphorus compound, $\alpha,\beta$-unsaturated carboxylic acid ester or ionic surfactant compound; c) at least one polyether; and d) at least one polyester, polycarbonate, polyalkylene glycol sorbitan ester, polyalkylene glycol glycidyl ether, glycidyl ether, glycoside, carboxylic acid ester of polyhydric alcohol, cyclodextrin, phosphorus compound, $\alpha,\beta$-unsaturated carboxylic acid ester or ionic surfactant compound. The catalyst of the present invention has increased activity in the preparation of a polyether polyol.

8 Claims, No Drawings

DOUBLE-METAL CYANIDE CATALYSTS FOR PREPARING POLYETHER POLYOLS

TECHNICAL FIELD OF THE INVENTION

The invention is directed to a double-metal cyanide ("DMC") catalyst for preparing a polyether polyol by the polyaddition of an alkylene oxide on to a starter compound containing active hydrogen atoms.

BACKGROUND OF THE INVENTION

DMC catalysts for the polyaddition of alkylene oxides on to starter compounds containing active hydrogen atoms are known. See, for example, U.S. Pat. Nos. 3,404,109, 3,829, 505, 3,941,849 and 5,158,922. The use of these DMC catalysts for the preparation of polyether polyols reduces the content of mono-functional polyethers with terminal double bonds, the so-called "mono-ols", in comparison to the preparation of polyether polyols with alkali catalysts, such as alkali metal hydroxides.

Polyether polyols produced by DMC catalysis can be used to process high-quality polyurethanes (e.g. elastomers, foams and coatings). DMC catalysts are usually obtained by reacting an aqueous solution of a metal salt with an aqueous solution of a metal cyanide salt in the presence of an organic complexing ligand, e.g., an ether. In a typical DMC catalyst preparation, aqueous solutions of zinc chloride (in excess) and potassium hexacyanocobaltate are mixed to form a dispersion. Dimethoxyethane (glyme) is then added to the dispersion. After filtering and washing the dispersion with the aqueous glyme solution, an active catalyst of the general formula $$Zn_3[Co(CN)_6]_2 \cdot xZnCl_2 \cdot yH_2O \cdot z\ glyme$$

is obtained. See, for example, EP 700 949.

The following references disclose DMC catalysts which use tert-butanol as the organic complexing ligand (by itself or in combination with a polyether) in the preparation of polyether polyols to further reduce the content of mono-functional polyethers with terminal double bonds: JP 4145123; U.S. Pat. No. 5,470,813; EP 700 949; EP 743 093; EP 761 708; and WO 97/40086. Additionally, the use of these DMC catalysts reduces the induction time in the polyaddition reaction of alkylene oxides with corresponding starter compounds. Catalyst activity also increases. By shortening alkoxylation times, the process of preparing polyether polyols becomes more cost effective. Additionally, due to their increased activity, DMC catalysts can be used in low concentrations (25 ppm or less), making the expensive process of removing catalysts from polyether polyols no longer necessary.

SUMMARY OF THE INVENTION

The object of the present invention is to provide a DMC catalyst for producing a polyether polyol by the polyaddition of an alkylene oxide on to a starter compound. The DMC catalyst of the present invention has increased catalyst activity compared to known DMC catalysts. The object of the present invention is accomplished by providing a DMC catalyst comprising: a) at least one DMC compound; b) at least one organic complexing ligand which is not a polyether, polyester, polycarbonate, polyalkylene glycol sorbitan ester, polyalkylene glycol glycidyl ether, glycidyl ether, glycoside, carboxylic acid ester of polyhydric alcohol, cyclodextrin, phosphorus compound, α,β-unsaturated carboxylic acid ester or ionic surfactant compound; c) at least one polyether; and d) at least one polyester, polycarbonate, polyalkylene glycol sorbitan ester, polyalkylene glycol glycidyl ether, glycidyl ether, glycoside, carboxylic acid ester of polyhydric alcohol, cyclodextrin, phosphorus compound, α,β-unsaturated carboxylic acid ester or ionic surfactant compound;

Hereinafter, the polyether c) and polyester, polycarbonate, polyalkylene glycol sorbitan ester, polyalkylene glycol glycidyl ether, glycidyl ether, glycoside, carboxylic acid ester of polyhydric alcohol, cyclodextrin, phosphorus compound, α,β-unsaturated carboxylic acid ester or ionic surfactant compound d), may be jointly referred to as "the complexing components" or separately as "the complexing component".

DETAILED DESCRIPTION OF THE INVENTION

The DMC catalysts of the present invention can optionally comprise water, preferably in an amount from 1 to 10 wt. %. Also, the DMC catalysts of the present invention can optionally comprise one or more water-soluble metal salts, preferably in an amount from 5 to 25 wt. %.

The DMC compound a) is the reaction product of a water-soluble metal salt and a water-soluble metal cyanide salt. A water-soluble metal salt suitable for the preparation of the DMC compound a) is represented by the formula (I)

$$M(X)_n \quad (I)$$

wherein

M is selected from Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III), (preferably, Zn(II), Fe(II), Co(II) and Ni(II));

each X is identical or different, preferably identical, and an anion, selected from halides, hydroxides, sulfates, carbonates, cyanates, thiocyanates, isocyanates, isothiocyanates, carboxylates, oxalates and nitrates; and n is 1, 2 or 3.

Examples of suitable water-soluble metal salts useful in the present invention are zinc chloride, zinc bromide, zinc acetate, zinc acetylacetonate, zinc benzoate, zinc nitrate, iron(II) sulfate, iron(II) bromide, iron(II) chloride, cobalt(II) chloride cobalt(II) thiocyanate, nickel(II) chloride, nickel(II) nitrate and mixtures thereof.

A water-soluble metal cyanide salt suitable for the preparation of the DMC compound a) is represented by the formula (II)

$$(Y)_a M'(CN)_b (A)_c \quad (II)$$

wherein

M' is selected from Fe(II), Fe(III), Co(II), Co(II), Cr(II), Cr(III), Mn(II), Mn(III), Ir(III), Ni(II), Rh(III), Ru(II), V(IV) and V(V), (Co(II), Co(III), Fe(II), Fe(III), Cr(III), Ir(III) and Ni(II) are preferred) and the water-soluble metal cyanide salt can comprise one or more of these metals;

each Y is identical or different, preferably identical, and is chosen from the group consisting of alkali metal ions and alkaline earth metal ions;

A is identical or different, preferably identical, and is chosen from halides, hydroxides, sulfates, carbonates, cyanates, thiocyanates, isocyanates, isothiocyanates, carboxylates, oxalates and nitrates; and a, b and c are integers, with the values for a, b and c being chosen so that electroneutrality of the metal cyanide salt is achieved (a is preferably 1, 2, 3 or 4; b is preferably 4, 5 or 6; and c preferably has the value 0).

Examples of water-soluble metal cyanide salts useful in the present invention are potassium hexacyanocobaltate(III), potassium hexacyanoferrate(II), potassium hexacyanoferrate(III), calcium hexacyanocobaltate(III) and lithium hexacyanocobaltate(III).

A preferred DMC compound a) according to the invention is a compound represented by the formula (III)

wherein

M is as defined in formula (I);

M' is as defined in formula (II); and x, x', y and z are integers and are chosen such that electroneutrality of the DMC compound exists.

Preferably, x=3, x'=1, y=6 and z=2';

M=Zn(II), Fe(II), Co(II) or Ni(II); and

M'=Co(III), Fe(III), Cr(III) or Ir(III).

Examples of suitable DMC compounds a) useful in the present invention are zinc hexacyanocobaltate(III), zinc hexacyanoiridate(III), zinc hexacyanoferrate(III) and cobalt (II) hexacyanocobaltate(III). Further examples of suitable DMC compounds a) are found in U.S. Pat. No. 5,158,922. Zinc hexacyanocobaltate(III) is the preferred DMC compound useful in the present invention.

Organic complexing ligands b) useful in the present invention are known and described in the following references: U.S. Pat. Nos. 5,158,922, 3,404,109, 3,829,505, 3,941,849, EP 700 949, EP 761 708, JP 4145123, U.S. Pat. No. 5,470,813, EP 743 093 and WO 97/40086. Organic complexing ligands useful in the present invention are water-soluble organic compounds with heteroatoms, such as oxygen, nitrogen, phosphorus or sulfur, which can form complexes with the DMC compound a).

Suitable organic complexing ligands useful in the present invention are alcohols, aldehydes, ketones, ethers, esters, amides, ureas, nitriles, sulfides and mixtures thereof. Preferred organic complexing ligands are water-soluble aliphatic alcohols, such as ethanol, isopropanol, n-butanol, iso-butanol, sec-butanol or tert-butanol. Tert-butanol is particularly preferred.

The organic complexing ligand b) is added either during the preparation of the DMC catalyst or directly after the precipitation of the DMC compound a). The organic complexing ligand b) is usually used in excess.

The DMC compound a) is present in amount from about 20 to about 90 wt. %, preferably 25 to 80 wt. %, based on the total weight of the DMC catalyst. The organic complexing ligand b) is present in an amount from about 0.5 to about 30 wt. %, preferably 1 to 25 wt. %, based on the total weight of the DMC catalyst. The DMC catalyst according to the invention preferably comprises from about 1 to about 80 wt. %, preferably 1 to 40 wt. %, based on the total weight of the DMC catalyst, of a mixture of the complexing components c) and d).

Polyethers c) suitable for use in the present invention are known and are described in the following references: EP 700 949, EP 761 708 and WO 97/40086. Preferably, polyether polyols with hydroxy functionalities of 1 to 8, preferably 1 to 3, and having number average molecular weights between 150 and $10^7$, preferably between 200 and $5·10^4$, are used in the present invention. The polyether polyols may be obtained by ring-opening polymerization of an epoxide in the presence of starter compounds containing active hydrogen atoms under basic, acid or co-ordinative catalysis (e.g., DMC catalysis).

Examples of suitable polyether polyols useful in the present invention are poly(oxypropylene)polyols, poly(oxyethylene)polyols, EO-capped poly(oxypropylene) polyols, EO/PO-polyols, butylene oxide polymers, butylene oxide copolymers with ethylene oxide and/or propylene oxide and poly(oxytetramethylene) glycols.

Polyesters suitable for use in the present invention are linear and partially branched polyesters having hydroxyl terminal groups and having average molecular weights below 10,000. Such polyesters are described in German Patent Application No. 197 45 120.9. Preferably, polyesters having average molecular weights of 400 to 6000 and OH values of 28 to 300 mg KOH/g which are suitable for the preparation of polyurethanes are used in the present invention. Examples of preferred polyesters are poly(ethylene glycol adipate), poly(diethylene glycol adipate), poly(dipropylene glycol adipate) branched with trimethylolpropane, poly(diethylene glycol adipate), poly(tetramethylene glycol adipate) and poly(2-methyl-1,3-propylene glutarate).

Polycarbonates useful in the present invention are aliphatic polycarbonates containing hydroxyl terminal groups and having average molecular weights below 12,000. Such polycarbonates are described in German Patent Application No. 197 57 574.9. Preferably, aliphatic polycarbonate diols with average molecular weights of 400 to 6000 are used in the present invention. Preferred polycarbonate diols are poly(hexane-1,6-diol) carbonates, poly(diethylene glycol) carbonates, poly(dipropylene glycol) carbonates, poly(triethylene glycol) carbonates, poly(1,4-bishydroxymethylcyclohexane) carbonates, poly(butane-1,4-diol) carbonates and poly(tripropylene glycol) carbonates.

Polyalkylene glycol sorbitan esters useful in the present invention are polyethylene glycol sorbitan esters (polysorbate) which are described in German Patent Application 198 42 382.9. Polyethylene glycol sorbitan mono-, di- and triesters of fatty acids having 6 to 18 carbon atoms and 2 to 40 moles of ethylene oxide are preferably used in the present invention.

Polyalkylene glycol glycidyl ethers useful in the present invention are mono- and diglycidyl ethers of polypropylene glycols and polyethylene glycols which are described in German Patent Application No. 198 34 573.9.

Glycidyl ethers of monomeric or polymeric (with at least two monomer units) aliphatic, aromatic or araliphatic mono-, di-, tri-, tetra- or polyfunctional alcohols are suitable for use in the present invention.

The use of glycidyl ethers of mono-, di-, tri-, tetra- or polyfunctional aliphatic alcohols such as butanol, hexanol, octanol, decanol, dodecanol, tetradecanol, ethane diol, propane-1,2-diol, propane-1,3-diol, butane-1,4-diol, 2,2-dimethylpropane-1,3-diol, propane-1,2,3-triol, hexane-1,6-diol, 1,1,1-tris(hydroxymethyl)ethane, 1,1,1-tris(hydroxymethyl)propane, tetrakis(hydroxymethyl)methane, sorbitol, polyethylene glycol and polypropylene glycol are preferably used in the present invention. Mono-, di-, tri-, tetra- and polyethers are suitable for use in the present invention.

Preferably, mono- or diglycidyl ethers of butanol, hexanol, octanol, decanol, dodecanol, tetradecanol, ethane diol or butane-1,4-diol, and of polypropylene glycol or polyethylene glycol, particularly with degrees of polymerization of 2 to 1000 monomer units, are used in the present invention.

Glycidyl ethers are typically obtained by reacting mono-, di-, tri-, tetra- or polyfunctional alcohols with epichlorohydrin in the presence of Lewis acids such as, for example, tin tetrachloride or boron trifluoride to corresponding chlorohydrins followed by dehydrohalogenation with bases (e.g., sodium hydroxide).

A method for preparing glycidyl ethers is generally known and described in *Kirk-Othmer, Encyclopedia of Chemical Technology*, Vol. 9, 4th Ed., 1994, p. 739 et seq. and *Ullmann, Encyclopedia of Industrial Chemistry*, Vol. A9, 5th Ed., Weinheim/New York, 1987, p. 552.

Glycidyl ethers useful for preparing the DMC catalysts of the present invention may be present in the finished catalysts in the form as originally used or in the chemically modified (hydrolyzed) form.

Suitable glycosides d) useful in the present invention are compounds composed of carbohydrates (sugars) and non-sugars (aglycones) in which the aglycone is bound to the full acetal by an oxygen atom by way of a glycosidic bond with a hemiacetal C atom of the carbohydrate.

Suitable sugar components are monosaccharides such as a glucose, galactose, mannose, fructose, arabinose, xylose and ribose, disaccharides such as sucrose and maltose and oligo- and polysaccharides such as starch.

Suitable non-sugar components are $C_1$–$C_{30}$ hydrocarbon radicals such as aryls, aralkyls and alkyl radicals, preferably aralkyls and alkyl radicals, more preferably, alkyl radicals having 1 to 30 carbon atoms.

Preferred glycosides useful in the present invention are alkyl polyglycosides which are usually obtained by reacting carbohydrates with alcohols such as methanol, ethanol, propanol and butanol or by transacetalization of short-chain alkyl glycosides with fatty alcohols having 8 to 20 carbon atoms in the presence of an acid. More preferred are alkyl polyglycosides with glucose as the repeating unit in the chain with alkyl chain lengths of $C_8$ to $C_{16}$ and average degrees of polymerization from 1 to 2.

A method for preparing glycosides is generally known and described in *Kirk-Othmer, Encyclopedia of Chemical Technology*, Vol. 4, 4th Ed., 1992, p. 916 et seq; *Römpp, Lexikon Chemie*, Vol. 2, 10th Ed., Stuttgart/New York, 1996, p. 1581 et seq; *Angewandte Chemie* 110, p. 1394–1412 (1998).

Suitable carboxylic acid esters of polyhydric alcohols useful in the present invention are esters of $C_2$–$C_{30}$ carboxylic acid with aliphatic or alicyclic alcohols having two or more hydroxyl groups per molecule, such as ethylene glycol, propane-1,2-diol, propane-1,3-diol, diethylene glycol, triethylene glycol, propane-1,2,3-triol (glycerol), butane-1,3-diol, butane-1,4-diol, butane triol, hexane-1,6-diol, 1,1,1-trimethylolethane, 1,1,1-trimethylolpropane, pentaerythritol, carbohydrates (sugar), and sugar alcohols such as sorbitol and sorbitan. Suitable sugars useful in the present invention include monosaccharides such as glucose, galactose, mannose, fructose, arabinose, xylose and ribose, disaccharides such as sucrose and maltose and oligo- and polysaccharides such as starch.

Suitable carboxylic acids useful in the present invention are $C_2$–$C_{30}$ carboxylic acids such as aryl, aralkyl and alkylcarboxylic acid, preferably, aralkyl and alkylcarboxylic acids, more preferably, alkylcarboxylic acids such as acetic acid, butyric acid, isovaleric acid, caproic acid, caprylic acid, capric acid, lauric acid, myristic acid, palmitic acid, stearic acid, oleic acid, linoleic acid and linolenic acid.

Preferred carboxylic acid esters of polyhydric alcohols useful in the present invention are esters of propane-1,2,3-triol (glycerol), 1,1,1-trimethylolpropane, pentaerythritol, maltose and sorbitan with $C_2$–$C_{18}$ alkylcarboxylic acids.

More preferred carboxylic acid esters of polyhydric alcohols useful in the present invention are mono-, di-, tri- or tetraesters of propane-1,2,3-triol (glycerol), pentaerythritol and sorbitan with $C_2$–$C_{18}$ alkylcarboxylic acids.

The method for preparing carboxylic acid esters of polyhydric alcohols or the isolation of carboxylic acid esters of polyhydric alcohols from fats is generally known and described in *Kirk-Othmer, Encyclopedia of Chemical Technology*, Vol. 9, 3rd Ed., 1980, p. 795 et seq; *Römpp, Lexikon Chemie*, 8th Ed., Stuttgart/New York, 1981; *Ullmann's Encyclopedia of Industrial Chemistry*, Vol. A10, 5th Ed., 1987, p. 173 to 218.

Cyclodextrins useful in the present invention are unsubstituted cyclodextrins and the esters, alkyl ethers, hydroxyalkyl ethers, alkoxycarbonylalkyl ethers and carboxyalkyl ether derivatives of cyclodextrins and their salts.

Cyclodextrins useful in the present invention are cyclohexa-cyclohepta- and cycloocta-amylose having 6, 7 or 8 glucose units with 1,4-linkages which are produced during the degradation of starch by *Bacillus maceran* or *Bacillus circulans* under the action of cyclodextrin glycosyl transferaseu, such as, for example, α-,β-,γ- or δ-cyclodextrin.

Carboxylic acids suitable for the cyclodextrin esters are aryl-, aralkyl-, and alkylcarboxylic acids with 2 to 30 carbon atoms, preferably, 2 to 24 carbon atoms, more preferably, 2 to 20 carbon atoms, preferably, aralkyl- and alkylcarboxylic acids, more preferably, alkylcarboxylic acids.

Suitable alkyl components for the cyclodextrin alkyl ethers, hydroxyalkyl ethers, alkoxycarbonylalkyl ethers and carboxyalkyl ethers are branched alkyl group having 1 to 30 carbon atoms, preferably 1 to 24 carbon atoms, more preferably, 1 to 20 carbon atoms.

Preferred cyclodextrins are α-, β- and γ-cyclodextrins, and mono-, di- and triethers, mono-, di- and triesters and monoesters/diethers of α-, β- and γ-cyclodextrins, which are typically obtained by etherification of α-, β- and γ-cyclodextrins with alkylating agents such as, for example, dimethyl sulfates and alkyl halides having 1 to 30 carbon atoms such as, for example, methyl-, ethyl-, propyl-, butyl-, pentyl-, hexyl-, heptyl-, octylchloride, bromide and iodide and/or esterification with acetic acids and succinic acids in the presence of acids.

More preferred cyclodextrins useful in the present invention are methyl-α-cyclodextrin, methyl-β-cyclodextrin, methyl-γ-cyclodextrin, ethyl-β-cyclodextrin, butyl-α-cyclodextrin, butyl-β-cyclodextrin, butyl-γ-cyclodextrin, 2,6-dimethyl-α-cyclodextrin, 2,6-dimethyl-β-cyclodextrin, 2,6-dimethyl-γ-cyclodextrin, 2,6-diethyl-β-cyclodextrin, 2,6-dibutyl-β-cyclodextrin, 2,3,6-trimethyl-α-cyclodextrin, 2,3,6-trimethyl-β-cyclodextrin, 2,3,6-trimethyl-γ-cyclodextrin, 2,3,6-trioctyl-α-cyclodextrin, 2,3,6-trioctyl-β-cyclodextrin, 2,3,6-triacetyl-α-cyclodextrin, 2,3,6-triacetyl-β-cyclodextrin, 2,3,6-triacetyl-γ-cyclodextrin, (2-hydroxy)propyl-α-cyclodextrin, (2-hydroxy)propyl-β-cyclodextrin, (2-hydroxy)-propyly-γ-cyclodextrin, partial or complete acetylated or succinylated α-, β- or γ-cyclodextrin, 2,6-dimethyl-3-acetyl-β-cyclodextrin and 2,6-dibutyl-3-acetyl-β-cyclodextrin.

A method for preparing cyclodextrins is known and described in *Römpp Lexikon Chemie*, 10th Ed., Stuttgart/New York 1997, p. 845 et seq and *Chemical Reviews* 98 (1998) 1743.

Phosphorus compounds suitable for use in the present invention are organic phosphates, phosphites, phosphonates, phosphonites, phosphinates and phosphinites.

Organic phosphates suitable for use in the present invention are mono-, di- or triesters of phosphoric acid, mono-, ditri- or tetraesters of pyrophosphoric acid, and mono-, di-, tri-, tetra- and polyesters of polyphosphoric acid and alcohol having 1 to 30 atoms.

Organic phosphites useful in the present invention are mono-, di- or triesters of phosphorous acid and alcohol having 1 to 30 carbon atoms.

Organic phosphonates suitable for use in the present invention are mono- or diesters of phosphonic acid, alkylphosphonic acid, arylphosphonic acid, alkoxycarbonylalkylphosphonic acid, alkoxycarbonylphosphonic acid, cyanoalkyl phosphonic acid, and cyano phosphonic acid or mono-, di-, tri- or tetraesters of alkyldiphosphonic acid and alcohol having 1 to 30 carbon atoms.

Phosphonites suitable for use in the present invention are diesters of phosphonous acid and arylphosphonous acid and alcohol having 1 to 30 carbon atoms.

Other phosphinates suitable for use in the present invention are esters of phosphinic acid, alkylphosphinic acid, dialkylphosphinic acid and arylphosphinic acid and alcohol having 1 to 30 carbon atoms.

Still other phosphinites suitable for use in the present invention are esters of alkylphosphinous acid, dialkylphosphinous acid and arylphosphinous acid and alcohol having 1 to 30 carbon atoms.

Alcohols useful in the present invention are mono- or polyhydric aryl-, aralkyl-, alkoxyalkyl- and alkyl alcohols having 1 to 30 carbon atoms, preferably, 1 to 24 carbon atoms, more preferably, 1 to 20 carbon atoms. Preferably, aralkyl-, alkoxyalkyl- and alkyl alcohols are used in the present invention. More preferred for use in the present invention are alkoxyalkyl- and alkyl alcohols.

Organic phosphates, phosphites, phosphonates, phosphonites, phosphinates and phosphinites useful in the present invention are typically obtained by reacting phosphoric acid, pyrophosphoric acid, polyphosphoric acid, phosphonic acid, alkylphosphonic acid, arylphosphonic acid, alkoxycarbonylalkylphosphonic acid, alkoxycarbonylphosphonic acid, cyanoalkyl phosphonic acid, cyano phosphonic acid, alkyldiphosphonic acid, phosphonous acid, phosphorous acid, phosphinic acid, phosphinous acid or the halogen derivative thereof or phosphorus oxide with a hydroxy compound having 1 to 30 carbon atoms such as methanol, ethanol, propanol, butanol, pentanol, hexanol, heptanol, octanol, nonanol, decanol, dodecanol, tridecanol, tetradecanol, pentadecanol, hexadecanol, heptadecanol, octadecanol, nonadecanol, methoxymethanol, ethoxymethanol, propoxymethanol, butoxymethanol, 2-ethoxyethanol, 2-propoxyethanol, 2-butoxyethanol, phenol, hydroxyacetic acid ethyl ester, hydroxyacetic acid propyl ester, hydroxypropionic acid ethyl ester, hydroxypropionic acid propyl ester, ethane-1,2-diol, propane-1,2-diol, 1,2,3-trihydroxypropane, 1,1,1-trimethylolpropane and pentaerythritol.

Preferred for use in the present invention are phosphoric acid triethyl esters, phosphoric acid tributyl esters, phosphoric acid trioctyl esters, phosphoric acid tris(2-ethylhexyl) esters, phosphoric acid tris(2-butoxyethyl) esters, butylphosphonic acid dibutyl esters, phenylphosphonic acid dioctyl esters, phosphonoformic acid triethyl esters, phosphonoacetic acid trimethyl esters, phosphonoacetic acid triethyl esters, 2-phosphonopropionic acid trimethyl esters, 2-phosphonopropionic acid triethyl esters, 2-phosphonopropionic acid tripropyl esters, 2-phosphonopropionic acid tributyl esters, 3-phosphonopropionic acid triethyl esters, tributylphosphites, trilaurylphosphites, tris-(3-ethyloxethanyl-3-methyl)phosphites and heptakis (dipropyleneglycol) phosphites.

The method for preparing esters of phosphoric acid, phosphorous acid, phosphonic acid, phosphonous acid, phosphinic acid and phosphinous acid is known and described in Kirk-Othmer: Encyclopedia of Chemical Technology, Vol. 8, 4th edition, 1996, p. 737 ff; Römpp Lexikon Chemie, Vol. 4, 10th Ed., Stuttgart/New York, 1998, p. 3280 ff; Ullmann's Encyclopedia of Industrial Chemistry, Vol. A19, 5th Ed., 1991, p. 545 ff; Houben-Wevl, Methoden der organischen Chemie, Vol. XII/1 and XII/2, Stuttgart 1963/1964.

α-β-unsaturated carboxylic acid esters suitable for use in the present invention are mono-, di-, tri- and polyesters of acrylic acid and alkyl-, alkoxy-, alkoxycarbonyl- and alkoxycarbonylalkylacrylic acids with alcohols having 1 to 30 carbon atoms and polyether polyols.

Suitable alcohol components are mono-, di-, tri- and polyhydric aryl-aralkyl-, alkoxyalkyl- and alkylalcohols having 1 to 30 carbon atoms, preferably, 1 to 24 carbon atoms, more preferably, 1 to 20 carbon atoms, preferably, aralkyl-, alkoxyalkyl- and alkylalcohols, more particularly preferably alkoxyalkyl- and alkylalcohols.

Suitable alcohol components also include polyalkylene glycols and polyalkylene glycol ethers, preferably polypropylene glycols and polyethylene glycols and the ethers of polypropylene glycols and polyethylene glycols having molecular weights of 200 to 10,000, preferably, 300 to 9000, more preferably 400 to 8000.

Suitable α,β-unsaturated carboxylic acids are acrylic acid and alkyl-, alkoxy- and alkoxycarbonylalkylacrylic acids having 1 to 20 carbon atoms such as 2-methylacrylic acid (methacrylic acid), 3-methylacrylic acid (crotonic acid), trans-2,3-dimethylacrylic acid (tiglic acid), 3,3-dimethylacrylic acid (senecio acid) and 3-methoxyacrylic acid. Acrylic acid, 2-methylacrylic acid, 3-methylacrylic acid and 3-methoxyacrylic acid are preferred. More preferred are areacrylic acid and 2-methylacrylic acid.

α,β-unsaturated carboxylic acid esters useful in the present invention are usually obtained by esterification of mono-, di-, tri-, tetra- and polyhydroxy compounds having 1 to 30 carbon atoms such as methanol, ethanol, ethane diol (ethylene glycol), propan-1-ol, propan-2-ol, propane-1,2-diol, propane-1,3-diol, propane-1,2,3-triol (glycerol), butanol, butan-2-ol, i-butanol, butane-1,2-diol, butane-1,3-diol, butane-2,3-diol, butane-1,4-diol, butane-1,2,3-triol, pentan-1-ol, hexan-1-ol, heptan-1-ol, octan-1-ol, nonan-1-ol, decan-1-ol, dodecan-1-ol, tridecan-1-ol, tetradecan-1-ol, hexadecan-1-ol, heptadecan-1-ol, 9-octadecanol, 1,1,1-tris (hydroxymethyl)propane, pentaerythritol, methoxymethanol, ethoxymethanol, propoxymethanol, butoxymethanol, 2-ethoxyethanol, 2-propoxyethanol, 2-butoxyethanol, hydroxyacetic acid methyl ester, hydroxyacetic acid ethyl ester, hydroxyacetic acid propyl ester, hydroxypropionic acid methyl ester, hydroxypropionic acid ethyl ester, hydroxypropionic acid propyl ester and polyether polyols such as polyethylene glycols and polypropylene glycols with corresponding α,β-unsaturated carboxylic acids, optionally, in the presence of catalysts.

Preferred are mono-, di- and triesters of acrylic acid and methacrylic acid with ethane diol, propane-1,2-diol, propane-1,3-diol, butane-1,4-diol, hexane-1,6-diol, propane-1,2,3-triol (glycerol), 1,1,1-tris(hydroxymethyl) propane, 1,1,1-tris(hydroxymethyl)propane ethoxylates, 1,1, 1-tris(hydroxymethyl)propane propoxylates, polyethylene glycols and polypropylene glycols.

More preferred are α,β-unsaturated carboxylic acid esters such as polyethylene glycol acrylate, polyethylene glycol diacrylate, polyethylene glycol methacrylate, polyethylene glycol dimethacrylate, polypropylene glycol acrylate, polypropylene glycol diacrylate, polypropylene glycol methacrylate, polypropylene glycol dimethacrylate, propane-1,2,3-triol diacrylate, propane-1,2,3-triol dimethacrylate, propane-1,2,3-triol triacrylate, propane-1,2,3-triol-1,3-(2-hydroxypropoxylate) diacrylate, propane-1,2,3-triol-propoxylate triacrylate, butane-1,4-diol acrylate, butane-1,4-diol dimethacrylate, hexane-1,6-diol diacrylate, 2-hydroxypropylmethacrylate, 1,1,1-tris(hydroxymethyl) propane triacrylate, 1,1,1-tris(hydroxymethyl)propane ethoxylate triacrylate, 1,1,1-tris(hydroxymethyl)propane ethoxylate trimethacrylate, 1,1,1-tris(hydroxymethyl) propane propoxylate triacrylate and 1,1,1-tris(hydroxymethyl)propane propoxylate trimethacrylate.

A method for preparing $\alpha,\beta$-unsaturated carboxylic acid esters are known and described in *Kirk-Othmer: Encyclopedia of Chemical Technology*, Vol. 8, 4th Ed., 1996, p. 737 et seq; *Römpp Lexikon Chemie*, Vol. 4, 10th Ed., Stuttgart/New York, 1998, p. 3286 et seq.; *Ullmann's Encyclopedia of Industrial Chemistry*, Vol. A19, 5th Ed. p. 991 et seq.; *Houben-Weyl: Methoden der organischen Chemie*, Vol. XII/1 and XII/2, Stuttgart 1963/1964.

A structural feature of the ionic surfactant compounds useful in the present invention is their amphiphilic molecular structure, i.e. they contain at least one hydrophilic ionic group (or a hydrophilic ionic molecule part) and at least one hydrophobic group (or a hydrophobic molecule part). Examples of ionic surfactant compounds useful in the present invention are surfactants, soaps, emulsifiers, detergents and dispersing agents.

The hydrophilic ionic groups may be of an anionic, cationic or zwitterionic (amphoteric) nature. Examples of anionic groups are carboxylate, sulfonate, sulfate, thiosulfate, phosphonate, phosphinate, phosphate and dithiophosphate groups. Examples of cationic groups are ammonium, phosphonium and sulfonium groups. Examples of zwitterionic groups are betaine, sulfobetaine and amine oxide groups.

The hydrophobic groups are preferably $C_2$–$C_{50}$ hydrocarbon radicals such as aryl, aralkyl and alkyl radicals. However, fluoroalkyl, silaalkyl, thiaalkyl and oxaalkyl groups are also suitable for use in the present invention.

Examples of suitable classes of compounds with hydrophilic anionic groups are carboxylates such as alkylcarboxylates (soaps), ether carboxylates (carboxymethylated ethoxylates), polycarboxylates such as malonates and succinates, bile acid salts, e.g., bile acid amides with sulfoalkyl and carboxyalkyl radicals in the salt form, amino acid derivatives such as sarcosides (alkanoylsarcosinates), sulfonamidocarboxylates, sulfates such as alkylsulfates, ether sulfates e.g., fatty alcohol ether sulfates, arylether sulfates and amidoether sulfates, sulfated carboxylates, sulfated carboxylic acid glycerides, sulfated carboxylic acid esters, sulfated carboxylic acid amides, sulfonates e.g., alkyl- aryl- and alkylarylsulfonates, sulfonated carboxylates, sulfonated carboxylic acid esters, sulfonated carboxylic acid amides, carboxylester sulfonates such as α-sulfo-fatty acid esters, carboxyamide sulfonates, sulfosuccinic acid esters, ether sulfonates, thiosulfates, phosphates e.g., alkylphosphates and glycerol phosphates, phosphonates, phosphinates and dithiophosphates.

Examples of classes of compounds with hydrophilic cationic groups suitable for use in the present invention are primary, secondary, tertiary and quaternary ammonium salts with alkyl, aryl and aralkyl radicals, alkoxylated ammonium salts, quaternary ammonium esters, benzylammonium salts, alkanolammonium salts, pyridinium salts, imidazolinium salts, oxazolinium salts, thiazolinium salts, salts of amine oxides, sulfonium salts, quinolinium salts, isoquinolinium salts and tropylium salts.

Examples of classes of compounds with hydrophilic zwitterionic (amphoteric) groups useful in the present invention are amine oxides, imidazolinium derivatives such as imidazolinium carboxylates, betaines, e.g., alkyl- and amidopropylbetaines, sulfobetaines, aminocarboxylic acids and phospholipids, e.g., phosphatidyl choline (lecithin).

The ionic surfactant compounds may also contain several hydrophilic (anionic and/or cationic and/or zwitterionic) groups or molecule parts.

The ionic surfactant compounds may be used on their own or in combination.

The ionic surfactant compounds suitable for use in the present invention are known and described in *Ullmann's Encyclopedia of Industrial Chemistry*, 5th Ed., Vol. A25, p. 747–817, VCH, Weinheim, 1994; *Kirk-Othmer, Encyclopedia of Chemical Technology*, 4th Ed., Vol. 23, p. 477–541, John Wiley & Sons, New York, 1997; *Tensid-Taschenbuch*, 2nd Ed., H. Stache, Carl Hanser Verlag, Munich, 1982; *Surfactant Science Series*, Vol. 1–74, M. J. Schick, Marcel Decker, New York, 1967–1998; *Methods in Enzymology*, Vol. 182, M. P. Deutscher, p. 239–253 Academic Press, San Diego, 1990.

The catalysts according to the invention may be crystalline, partially crystalline or amorphous. The analysis of crystallinity is usually carried out by powder X-ray diffraction.

The analysis of the catalyst composition is usually carried out by elemental analysis, thermogravimetry or extractive removal of the complex-forming components followed by a gravimetric determination.

A preferred DMC catalyst according to the present invention comprises a) zinc hexacyanocobaltate (III); b) tert.-butanol; c) at least one polyether; and d) at least one polyester, polycarbonate, polyalkylene glycol sorbitan ester, polyalkylene glycol glycidyl ether, glycidyl ether, glycoside, carboxylic acid ester of polyhydric alcohol, cyclodextrin, phosphorus compound, $\alpha,\beta$unsaturated carboxylic acid ester or ionic surfactant compound.

The DMC catalyst of the present is typically prepared in aqueous solution by reacting a metal salt, preferably one represented by the formula (I), with a metal cyanide salt, preferably one represented by the formula (II), in the presence of an organic complexing ligand b), which is neither a polyether nor polyester, polycarbonate, polyalkylene glycol sorbitan ester, polyalkylene glycol glycidyl ether, glycidyl ether, glycoside, carboxylic acid ester of polyhydric alcohol, cyclodextrin, phosphorus compound, $\alpha,\beta$-unsaturated carboxylic acid ester or ionic surfactant compound. In this preparation, in an aqueous solution, the metal salt (for example, zinc chloride, employed in a stoichiometric excess (at least 50 mol. %, based on the molar amount of metal cyanide salt) is reacted with the metal cyanide salt (for example, potassium hexacyanocobaltate) in the presence of the organic complexing ligand b) (for example tert-butanol). A suspension comprising the DMC compound a) (for example, zinc hexacyanocobaltate), water, excess metal salt, and the organic complexing ligand b) is formed.

The organic complexing ligand b) is either present in the aqueous solution of the metal salt and/or the metal cyanide salt, or is added directly to the suspension after precipitation of the DMC compound a). Preferably, the mixture of aqueous solution and organic complexing ligand b) is vigorously stirred. The suspension formed is then treated with a mixture of the complexing components c) and d). The mixture of complexing components c) and d) is preferably used in a mixture of water and organic complexing ligand b).

The DMC catalyst is then isolated from the suspension by known techniques, such as centrifugation or filtration. In a preferred embodiment of the present invention, the isolated DMC catalyst is washed with an aqueous solution of the organic complexing ligand b) (for example, by re-suspension and then renewed isolation by filtration or centrifugation). Water-soluble by-products, for example, potassium chloride, are removed from the DMC catalyst by washing the DMC catalyst with an aqueous solution of the organic complexing ligand b).

The amount of organic complexing ligand b) in the aqueous wash solution is preferably between 40 and 80 wt. %, based on the total weight of aqueous wash solution. Preferably, a small amount of the complexing components c) and d), preferably 0.5 to 5 wt. %, based on the total weight of aqueous wash solution, is added to the aqueous wash solution.

Preferably, the DMC catalyst is washed more than once. This can be accomplished by repeating the aqueous wash solution procedure described above. However, the use of a non-aqueous wash solution for further washing operations is preferred. The non-aqueous wash solution comprises a mixture of organic complexing ligand b) and the complexing components c) and d).

The washed DMC catalyst is then dried, optionally after pulverization, at a temperature between 20–100° C. and under a pressure of between 0.1 mbar to 1,013 mbar.

The present invention is also directed to the use of the DMC catalyst according to the invention in a process for the preparation of a polyether polyol by the polyaddition of an alkylene oxide on to a starter compound containing active hydrogen atoms.

Alkylene oxides preferably used in the present invention are ethylene oxides, propylene oxides, butylene oxides and mixtures thereof. The build-up of the polyether chains by alkoxylation can be accomplished by using only one monomeric epoxide, or randomly or blockwise with 2 or 3 different monomeric epoxides. Further details in this regard can be found in Ullmanns Encyclopädie der industriellen Chemie, Volume A21, 1992, p. 670 et seq.

Starter compounds containing active hydrogen atoms which are preferably used in the present invention are compounds with number average molecular weights of 18 to 2,000 with 1 to 8 hydroxyl groups. Examples of such starter compounds are ethylene glycol, diethylene glycol, triethylene glycol, 1,2-propylene glycol, 1,4-butanediol, hexamethylene glycol, bisphenol A, trimethylolpropane, glycerol, pentaerythritol, sorbitol, sucrose, degraded starch and water.

A starter compound containing active hydrogen atoms which has been prepared by conventional alkali catalysis from a low molecular weight starter compound mentioned above and is an oligomeric alkoxylation product with a number average molecular weight of 200 to 2,000 is preferably used in the present invention.

The polyaddition, catalyzed by the DMC catalyst of the present invention, of an alkylene oxide on to a starter compound containing active hydrogen atoms is carried out at a temperature between 20 to 200° C., preferably between 40 to 180° C., more preferably, between 50 to 150° C. The reaction can be carried out under an overall pressure of 0.0001 to 20 bar. The polyaddition can be carried out in bulk or an inert organic solvent, such as toluene and/or tetrahydrofuran ("THF"). The amount of solvent is usually 10 to 30 wt. %, based on the total weight of polyether polyol to be prepared.

The DMC catalyst concentration is chosen such that sufficient control of the polyaddition reaction is possible under the given reaction conditions. The catalyst concentration is typically in the range from 0.0005 wt. % to 1 wt. %, preferably, 0.001 wt. % to 0.1 wt. %, more preferably, 0.001 to 0.0025 wt. %, based on the total weight of polyether polyol to be prepared.

The number average molecular weight of the polyether polyol prepared by the process of the present invention is in the range from 500 to 100,000 g/mol, preferably, 1,000 to 50,000 g/mol, more preferably, 2,000 to 20,000 g/mol.

The polyaddition can be carried out continuously or discontinuously, (e.g. in a batch or in semi-batch process).

Because of their significantly increased activity, the DMC catalysts of the present invention can be used in low concentrations (25 ppm and less, based on the amount of polyether polyol to be prepared). In the preparation of polyurethanes, if a polyether polyol is prepared in the presence of the DMC catalyst according to the present invention, the step of removing the DMC catalyst from the polyether polyol can be omitted without adversely affecting the product quality of the resulting polyurethane. See Kunststoffhandbuch, Vol. 7, Polyurethane, 3rd Ed. 1993, p. 25–32 and 57–67.

EXAMPLES

Catalyst Preparation

Example 1

Preparation of a DMC Catalyst With Complexing Components Polyether and Cyclodextrin (Catalyst A):

A solution of 12.5 g (91.5 mmole) of zinc chloride in 20 ml of distilled water was added to a solution of 4 g (12 mmole) of potassium hexacyanocobaltate in 70 ml of distilled water and vigorously stirred (24,000 rpm) until a suspension was formed. Immediately afterwards, a mixture of 50 g of tert.-butanol and 50 g of distilled water was added to the suspension formed and then stirred vigorously for 10 min (24,000 rpm). A mixture of 0.5 g of a polypropylene glycol with a number-average molecular weight of 2000 ("polypropylene glycol 2000") and 0.5 g of 2,6-dimethyl-β-cyclodextrin Beta W7 M 1,8 (Wacker-Chemie GmbH, D-81737 Munich), 1 g of tert.-butanol and 100 g of distilled water was then added stirred for 3 min (1000 rpm). The solids were isolated by filtration, then stirred for 10 min with a mixture of 70 g of tert.-butanol, 30 g of distilled water, 0.5 g of polypropylene glycol 2000 and 0.5 g of 2,6-dimethyl-β-cyclodextrin Beta W7 M 1,8 (10,000 rpm) and filtered again. Finally, the solids were stirred again for 10 minutes with a mixture of 100 g of tert. butanol, 0.25 g of polypropylene glycol 2000 and 0.25 g of 2,6-dimethyl-β-cyclodextrin Beta W7 M 1,8 (10,000 rpm). After filtration, the catalyst was dried at 50° C. and normal pressure to constant weight.

Example 2

Preparation of a DMC Catalyst With Complexing Components Polyether and Phosphorus Compound (Catalyst B):

The procedure was as set forth in Example 1, however, 2-phosphonopropionic acid triethyl ester was used in lieu of 2,6-dimethyl-β-cyclodextrin Beta W7 M 1,8.

Example 3

Preparation of a DMC Catalyst With Complexing Components Polyether and Polyester (Catalyst C):

The procedure was as set forth in Example 1, however, poly(2-methyl-1,3-propylene glutarate) with a number-average molecular weight of 1020 g/mole was used in lieu of of 2,6-dimethyl-β-cyclodextrin Beta W7 M 1,8.

Example 4
Preparation of a DMC Catalyst With Complexing Components Polyether and Polycarbonate (Catalyst D):

The procedure was as set forth in Example 1, however, a dipropylene glycol polycarbonate diol with a number-average molecular weight of 1968 g/mole (determined by measuring the OH value) was used in lieu of 2,6-dimethyl-β-cyclodextrin Beta W7 M 1,8.

Example 5
Preparation of a DMC Catalyst With Complexing Components Polyether and Glycidyl Ether (Catalyst E):

The procedure was as set forth in Example 1, however, polypropylene glycol diglycidyl ether with a number-average molecular weight of 640 g/mole was used in lieu of 2,6-dimethyl-β-cyclodextrin Beta W7 M 1,8.

Example 6
Preparation of a DMC Catalyst With Complexing components Polyether and Carboxylic Acid Ester of Polyhydric Alcohols (Catalyst F):

The procedure was as set forth in Example 1, however, a glycerol tricapronate (RILANIT® GTC, available from Henkel K G a.A., D-40589 Düsseldorf) was used in lieu of 2,6-dimethyl-β-cyclodextrin Beta W7 M 1,8.

Example 7
Preparation of a DMC Catalyst With Complexing Components Polyether and Glycoside (Catalyst G):

The procedure was as set forth in Example 1, however, an alkyl polyglycoside (GIUCOPON® 650 EC, available from Henkel K G a.A., D-40589 Düsseldorf) was used in lieu of 2,6-dimethyl-β-cyclodextrin eta W7 M 1,8.

Example 8
Preparation of a DMC Catalyst With Complexing Components Polyether and α,β-unsaturated Carboxylic Acid Ester (Catalyst H):

The procedure was as set forth in Example 1, however, 1,1,1-tris(hydroxymethyl)propane triacrylic acid ester was used in lieu of 2,6-dimethyl-β-cyclodextrin Beta W7 M 1,8.

Example 9
Preparation of a DMC Catalyst With Complexing Components Polyether and Sorbitan Ester (Catalyst I)

The procedure was as set forth in Example 1, however, a polyethylene glycol(20) sorbitan monolaurate (TWEEN® 20, available from Sigma-Aldrich Chemie GmbH, D-82041 Deisenhofen) was used in lieu of 2,6-dimethyl-β-cyclodextrin Beta W7 M 1,8.

Example 10
Preparation of a DMC Catalyst With Complexing Components Polyether and Ionic Surfactant Compound (Catalyst J):

The procedure was as set forth in Example 1, however, L-α-lecithin was used in lieu of 2,6-dimethyl-p-cyclodextrin Beta W7 M 1,8.

Example 11 (Comparison)
Preparation of a DMC Catalyst With Polyether as the Complexing Component (Catalyst K):

A solution of 12.5 g (91.5 mmole) of zinc chloride in 20 ml of distilled water was added to a solution of 4 g (12 mmole) of potassium hexacyanocobaltate in 70 ml of distilled water and stirred vigorously (24,000 rpm) until a suspension was formed. Immediately afterwards, a mixture of 50 g of tert.-butanol and 50 g of distilled water was added to the suspension formed and then stirred vigorously for 10 min (24,000 rpm). A mixture of 1 g of a polypropylene glycol 2000, 1 g of tert.-butanol and 100 g of distilled water was then added and stirred for 3 min (1000 rpm). The solids were isolated by filtration, then stirred for 10 min (10,000 rpm) with a mixture of 70 g of tert.-butanol, 30 g of distilled water, 1 g of polypropylene glycol 2000 and filtered again. Finally, the solids were stirred again for 10 minutes with a mixture of 100 g of tert. butanol and 0.5 g of polypropylene glycol 2000 (10,000 rpm). After filtration, the catalyst was dried at 50° C. and normal pressure to constant weight.

Yield of dry catalyst in powder form: 6.2 g

Elemental analysis, thermogravimetric analysis and extraction: Cobalt=11.6 wt. %, zinc=24.6 wt. %, tert.-butanol=3.0 wt. %, polypropylene glycol 2000=25.8 wt. %.

Example 12 (Comparison)
Preparation of a DMC Catalyst With a Cyclodextrin as the Complexing Component (Catalyst L):

The procedure was as set forth in Example 11, however, 2,6-dimethyl-β-cyclodextrin Beta W7 M 1,8 was used in lieu of polypropylene glycol 2000.

Yield of dry catalyst in powder form: 5.4 g

Elemental analysis, thermogravimetric analysis and extraction: Cobalt=10.5 wt. %, zinc=24.4 wt. %, tert.-butanol=10.0 wt. %, 2,6-dimethyl-β-cyclodextrin=13.8 wt. %.

Example 13 (Comparison)
Preparation of a DMC Catalyst With a Phosphorus Compound as the Complexing Component (Catalyst M):

The procedure was as set forth in Example 11, however, 2-phosphonopropionic acid triethyl ester was used in lieu of polypropylene glycol 2000.

Yield of dry catalyst in powder form: 5.9 g.

Elemental analysis, thermogravimetric analysis and extraction: Cobalt=10.2 wt. %, zinc=23.5 wt. %, tert.-butanol=2.3 wt. %, 2-phosphonopropionic acid triethyl ester=26.1 wt. %

Example 14 (Comparison)
Preparation of a DMC Catalyst With a Polyester as the Complexing Component (Catalyst N):

The procedure was as set forth in Example 11, however, poly(2-methyl-1,3-propylene glutarate) with a number-average molecular weight of 1020 g/mole was used in lieu of polypropylene glycol 2000.

Yield of dry catalyst in powder form: 5.4 g.

Elemental analysis: Cobalt=12.1 wt. %, zinc=27.0 wt. %.

Example 15 (Comparison)
Preparation of a DMC Catalyst With a Polycarbonate as the Complexing Component (Catalyst O):

The procedure was as set forth in Example 11, however, a dipropylene glycol polycarbonate with a number-average molecular weight of 1968 g/mole (determined by measuring the OH value) was used in lieu of polypropylene glycol 2000.

Yield of dry catalyst in powder form: 5.33 g.

Elemental analysis, thermogravimetric analysis and extraction: Cobalt=10.8 wt. %, zinc=24.4 wt. %, tert.-butanol=20.2 wt. %, polycarbonate=15.0 wt. %

Example 16 (Comparison)
Preparation of a DMC Catalyst With a Glycidyl Ether as the Complexing Component (Catalyst P):

The procedure was as set forth in Example 11, however, polypropylene glycol diglycidyl ether with a number-average molecular weight of 380 g/mole was used in lieu of polypropylene glycol 2000.

Yield of dry catalyst in powder form: 8.70 g.

Elemental analysis, thermogravimetric analysis and extraction: Cobalt=8.7 wt. %, zinc=20.2 wt. %, tert.-butanol=4.2 wt. %, polypropylene glycol diglycidyl ether=30.5 wt. %

Example 17 (Comparison)
Preparation of a DMC Catalyst With a Carboxylic Acid Ester of Polyhydric Alcohol as the Complexing Component (Catalyst Q):

The procedure was as set forth in Example 11, however, glycerol tricapronate (RILANIT® GTC, available from Henkel K G a.A., D-40589 Düsseldorf) was used in lieu of polypropylene glycol 2000.

Yield of dry catalyst in powder form: 5.0 g.

Elemental analysis, thermogravimetric analysis and extraction: Cobalt=12.4 wt. %, zinc=26.9 wt. %, tert.-butanol=8.6 wt. %, glycerol tricapronate=8.4 wt. %

Example 18 (Comparison)
Preparation of a DMC Catalyst With a Glycoside as the Complexing Component (Catalyst R):

The procedure was as set forth in Example 11, however, alkyl polyglycoside (GLUCOPON® 650 EC, available from Henkel K G a.A., D-40589 Düsseldorf) was used instead of polypropylene glycol 2000.

Yield of dry catalyst in powder form: 8.70 g.

Elemental analysis, thermogravimetric analysis and extraction: Cobalt=8.7 wt. %, zinc=20.2 wt. %, tert.-butanol=4.2 wt. %, alkyl polyglycoside=30.5 wt. %

Example 19 (Comparison)
Preparation of a DMC Catalyst With an α,β-unsaturated Carboxylic Acid Ester as the Complexing Component (Catalyst S):

The procedure was as set forth in Example 11, however, 1,1,1-tris(hydroxymethyl)propane triacrylic acid ester was used in lieu of polypropylene glycol 2000.

Yield of dry catalyst in powder form: 5.0 g.

Elemental analysis, thermogravimetric analysis and extraction: Cobalt=11.8 wt. %, zinc=27.7 wt. %, tert.-butanol=11.8 wt. %, 1,1,1-tris(hydroxymethyl)propane triacrylic acid ester=2.4 wt. %.

Example 20 (Comparison)
Preparation of a DMC Catalyst With a Sorbitan Ester as the Complexing Component (Catalyst T):

The procedure was as set forth in Example 11, however, polyethylene glycol (20) sorbitan monolaurate (TWEEN® 20, available from Sigma-Aldrich Chemie GmbH, D-82041 Deisenhofen) was used in lieu of polypropylene glycol 2000.

Yield of dry catalyst in powder form: 5.6 g.

Elemental analysis, thermogravimetric analysis and extraction: Cobalt=11.9 wt. %, zinc=24.9 wt. %, tert.-butanol=3.6 wt. %, polyethylene glycol (20) sorbitan monolaurate=14.6 wt. %

Example 21 (Comparison)
Preparation of a DMC Catalyst With an Ionic Surfactant Compound as the Complexing Component (Catalyst U):

The procedure was as set forth in Example 11, however, L-α-lecithin was used in lieu of polypropylene glycol 2000.

Yield of dry catalyst in powder form: 2.0 g.

Elemental analysis, thermogravimetric analysis and extraction: Cobalt=13.7 wt. %, zinc=25.6 wt. %, tert.-butanol=7.5 wt. %, L-α-lecithin=12.0 wt. %

Preparation of Polyether Polyols

General Procedure 50 g of polypropylene glycol starter (number-average molecular weight=1,000 g/mole) and 3–5 mg of catalyst (15–25 ppm, based on the amount of polyether polyol to be prepared) were charged to a 500 ml pressurized reactor under inert gas (argon) and heated to 105° C. while stirring. Propylene oxide (about 5 g) was then added in one operation until the overall pressure had risen to 2.5 bar. Further propylene oxide was then added only when an accelerated pressure drop was observed in the reactor. This accelerated pressure drop indicated that the catalyst was activated. The remaining propylene oxide (145 g) was then added continuously at a constant overall pressure of 2.5 bar. After all the propylene oxide had been added and after a 2 hour post-reaction time at 105° C., volatile matter was distilled at 90° C. (1 mbar) and the mixture was then cooled to room temperature.

The polyether polyols obtained were characterized by determining the OH values, the double bond content and the viscosities.

The progress of the reaction was monitored on the basis of the time-conversion curves (propylene oxide consumption [g] vs. reaction time [min]. The induction time was determined from the point of intersection of the tangent at the steepest point of the time-conversion curve with the extended base line of the curve. The propoxylation times that were decisive for the catalyst activity correspond to the period between catalyst activation (end of the induction period) and the end of the propylene oxide feed. The total reaction time was the sum of the induction and propoxylation time.

Example 22
Preparation of a Polyether Polyol With Catalyst B (25 ppm):

| | |
|---|---|
| Induction time | 99 min |
| Propoxylation time | 110 min |
| Total reaction time | 209 min |
| Polyether polyol | |
| OH value (mg KOH/g) | 29.9 |
| Double bond content (mmole/kg) | 10 |
| Viscosity 25° C. (mPas) | 931 |

Example 23 (Comparison)
Preparation of a Polyether Polyol With Catalyst K (25 ppm):

| | |
|---|---|
| Induction time | 100 min |
| Propoxylation time | 110 min |
| Total reaction time | 210 min |
| Polyether polyol | |
| OH value (mg KOH/g) | 28.1 |
| Double bond content (mmole/kg) | 7 |
| Viscosity 25° C. (mPas) | 849 |

Example 24 (Comparison)
Preparation of a Polyether Polyol With Catalyst L (25 ppm):

| | |
|---|---|
| Induction time | 160 min |
| Propoxylation time | 160 min |
| Total reaction time | 320 min |
| Polyether polyol | |
| OH value (mg KOH/g) | 30.2 |
| Double bond content (mmole/kg) | 9 |
| Viscosity 25° C. (mPas) | 855 |

Example 25 (Comparison)
Preparation of a Polyether Polyol with Catalyst M (25 ppm):

| | |
|---|---|
| Induction time | 99 min |
| Propoxylation time | 110 min |
| Total reaction time | 209 min |
| Polyether polyol | |
| OH value (mg KOH/g) | 29.9 |
| Double bond content (mmole/kg) | 10 |
| Viscosity 25° C. (mPas) | 931 |

Example 26 (Comparison)
Preparation of a Polyether Polyol With Catalyst N (25 ppm):

| | |
|---|---|
| Induction time | 90 min |
| Propoxylation time | 93 min |
| Total reaction time | 183 min |
| Polyether polyol | |
| OH value (mg KOH/g) | 29.9 |
| Double bond content (mmole/kg) | 6 |
| Viscosity 25° C. (mPas) | 845 |

Example 27 (Comparison)
Preparation of a Polyether Polyol With Catalyst O (15 ppm):

| | |
|---|---|
| Induction time | 120 min |
| Propoxylation time | 190 min |
| Total reaction time | 310 min |
| Polyether polyol | |
| OH value (mg KOH/g) | 29.6 |
| Double bond content (mmole/kg) | 6 |
| Viscosity 25° C. (mPas) | 901 |

Example 28 (Comparison)
Preparation of a Polyether Polyol With Catalyst P (25 ppm):

| | |
|---|---|
| Induction time | 130 min |
| Propoxylation time | 31 min |
| Total reaction time | 161 min |
| Polyether polyol | |
| OH value (mg KOH/g) | 29.5 |
| Double bond content (mmole/kg) | 7 |
| Viscosity 25° C. (mPas) | 849 |

Example 29 (Comparison)
Preparation of a Polyether Polyol With Catalyst Q (25 ppm):

| | |
|---|---|
| Induction time | 180 min |
| Propoxylation time | 115 min |
| Total reaction time | 295 min |
| Polyether polyol | |
| OH value (mg KOH/g) | 29.6 |
| Double bond content (mmole/kg) | 9 |
| Viscosity 25° C. (mPas) | 914 |

Example 30 (Comparison)
Preparation of a Polyether Polyol With Catalyst R (20 ppm):

| | |
|---|---|
| Induction time | 350 min |
| Propoxylation time | 355 min |
| Total reaction time | 705 min |
| Polyether polyol | |
| OH value (mg KOH/g) | 29.6 |
| Double bond content (mmole/kg) | 6 |
| Viscosity 25° C. (mPas) | 1013 |

Example 31 (Comparison)
Preparation of a Polyether Polyol With Catalyst S (25 ppm):

| | |
|---|---|
| Induction time | 120 min |
| Propoxylation time | 87 min |
| Total reaction time | 207 min |
| Polyether polyol | |
| OH value (mg KOH/g) | 29.8 |
| Double bond content (mmole/kg) | 7 |
| Viscosity 25° C. (mPas) | 922 |

Example 32 (Comparison)
Preparation of a Polyether Polyol With Catalyst T (25 ppm):

| | |
|---|---|
| Induction time | 265 min |
| Propoxylation time | 175 min |
| Total reaction time | 440 min |
| Polyether polyol | |
| OH value (mg KOH/g) | 30.2 |
| Double bond content (mmole/kg) | 8 |
| Viscosity 25° C. (mPas) | 926 |

Example 33 (Comparison)
Preparation of a Polyether Polyol With Catalyst U (25 ppm):

| | |
|---|---|
| Induction time | 125 min |
| Propoxylation time | 140 min |
| Total reaction time | 265 min |
| Polyether polyol | |
| OH value (mg KOH/g) | 29.5 |
| Double bond content (mmole/kg) | 6 |
| Viscosity 25° C. (mPas) | 921 |

What is claimed is:

1. A double-metal cyanide catalyst comprising:
   a) at least one double-metal cyanide compound;
   b) at least one organic complex ligand which is not a polyether, polyester, polycarbonate, polyakylene glycol sorbitan ester, polyalkylene glycol glycidyl ether, glycidyl ether, glycoside, carboxylic acid ester of polyhydric alcohol, cyclodextrin, phosphorus compound, α,β-unsaturated carboxylic acid ester or ionic surfactant compound;
   c) at least one polyether; and
   d) at least one polyester, polycarbonate, polyalkylene glycol, sorbitan ester, polyalkylene glycol glycidyl ether, glycidyl ether, glycoside, carboxylic acid ester of polyhydric alcohol, cyclodextrin, phosphorus compound, α,β-unsaturated carboxylic acid ester or ionic surfactant compound.

2. The double-metal cyanide catalyst according to claim 1, further comprising water and/or a water-soluble metal salt.

3. The double-metal cyanide catalyst according to claim 1, wherein the double-metal cyanide compound is zinc hexacyanocobaltate (III).

4. The double-metal cyanide catalyst according to claim 1, wherein the organic complex ligand is an alcohol, aldehyde, ketone, ether, ester, amide, urea, nitrile, sulfide and/or a mixture thereof.

5. The double-metal cyanide catalyst according to claim 1, wherein the organic complex ligand is tert.-butanol.

6. The double-metal cyanide catalyst according to claim 1, wherein the double-metal cyanide catalyst contains up to about 80 wt. %, based on the total weight of the double-metal cyanide catalyst, of a mixture of c) and d).

7. A process for the preparation of a double-metal cyanide catalyst according to claim 1, comprising the steps of:
   (a) reacting, in aqueous solution,
      (I) at least one metal salt,
      (II) with at least one metal cyanide salt, in the presence of
      (III) an organic complex ligand, which is not a polyether, polyester, polycarbonate, polyalkylene glycol sorbitan ester, polyalkylene glycol glycidyl ether, glycidyl ether, glycoside, carboxylic acid ester of polyhydric alcohol, cyclodextrin, phosphorus compound, α,β-unsaturated carboxylic acid ester or ionic surfactant compound; to form a suspension; and
   (b) treating the suspension with at least one polyether and at least one polyester, polycarbonate, polyalkylene glycol sorbitan ester, polyalkylene glycol glycidyl ether, glycidyl ether, glycoside, carboxylic acid ester of polyhydric alcohol, cyclodextrin, phosphorus compound, α,β-unsaturated carboxylic acid ester or ionic surfactant compound.

8. A process according to claim 7, further comprising the steps of:
   (c) isolating the catalyst from suspension after (b);
   (d) washing the isolated catalyst; and
   (e) drying the isolated catalyst.

* * * * *